US011618506B1

(12) United States Patent
Williamson (10) Patent No.: US 11,618,506 B1
(45) Date of Patent: Apr. 4, 2023

(54) TRAILER FLOOR PANEL (71) Applicant: Richard Leslie Williamson, Ocala, FL (US)

(72) Inventor: Richard Leslie Williamson, Ocala, FL (US)

(*) Notice: Subject to any disclaimer, the term of this patent is extended or adjusted under 35 U.S.C. 154(b) by 0 days.

(21) Appl. No.: 17/884,644

(22) Filed: Aug. 10, 2022

(51) Int. Cl.
B62D 25/20 (2006.01)
B62D 65/02 (2006.01)
B62D 29/00 (2006.01)

(52) U.S. Cl.
CPC ......... *B62D 25/2054* (2013.01); *B62D 65/02* (2013.01); *B62D 29/00* (2013.01)

(58) Field of Classification Search
CPC ...... B62D 53/06; B62D 53/061; B62D 33/02; B62D 25/2054
USPC ...................................... 296/184.1
See application file for complete search history.

(56) References Cited

U.S. PATENT DOCUMENTS

| 5,143,418 | A  | * | 9/1992  | Fouquet ............ B62D 25/2054 52/177 |
| 7,152,911 | B1 | * | 12/2006 | McNulty ................ B62D 33/02 296/184.1 |
| 8,267,466 | B1 | * | 9/2012  | Smith, Jr. .......... B62D 33/0207 296/184.1 |
| 9,272,740 | B1 | * | 3/2016  | Portenier ............... B62D 33/02 |
| 9,988,086 | B1 | * | 6/2018  | Adkins, Jr. ........ B62D 25/2054 |
| 2005/0152774 | A1 | * | 7/2005 | Pierce ...................... B60P 1/00 414/809 |
| 2005/0241152 | A1 | * | 11/2005 | McNulty ............ B62D 25/2054 29/897.2 |
| 2005/0242620 | A1 | * | 11/2005 | McNulty ................ B62D 33/02 296/183.1 |
| 2006/0087152 | A1 | * | 4/2006 | Kuriakose .......... B62D 25/2054 296/184.1 |
| 2008/0150322 | A1 | * | 6/2008 | Shelbo .................... B62D 33/02 296/184.1 |
| 2008/0202056 | A1 | * | 8/2008 | Jantzen .............. B62D 25/2054 52/690 |
| 2011/0233952 | A1 | * | 9/2011 | Kuriakose .......... B62D 25/2054 411/366.1 |
| 2011/0298245 | A1 | * | 12/2011 | Jarocki .................. B62D 21/03 296/193.07 |
| 2017/0043809 | A1 | * | 2/2017 | Cortes Saenz ......... B62D 21/03 |
| 2019/0300075 | A1 | * | 10/2019 | Wiberg ................ B62D 29/008 |
| 2019/0375456 | A1 | * | 12/2019 | Cassway ................ B62D 21/20 |
| 2020/0247481 | A1 | * | 8/2020 | Barnicle ............ B62D 33/0207 |
| 2020/0391809 | A1 | * | 12/2020 | Urban .................... B62D 27/00 |
| 2020/0392742 | A1 | * | 12/2020 | Wang .................... B29C 44/321 |
| 2021/0129917 | A1 | * | 5/2021 | Sagarsee ........... B62D 25/2054 |

(Continued)

OTHER PUBLICATIONS

2008 Dodge Ram 5500 BFT article from MotorTrend (Year: 2008).*

*Primary Examiner* — Gregory A Blankenship
(74) *Attorney, Agent, or Firm* — Saliwanchik, Lloyd & Eisenschenk (57) ABSTRACT

A panel for constructing a trailer floor is provided. The panel includes a platform from which a plurality of sidewalls extend from a first edge and a second edge, with slots therebetween for receiving cross members. The sidewalls engage with the cross members to inhibit movement of the sidewalls away from the slots, which simultaneously inhibits the panel from flexing. The inhibition of flexure of the panel increases the load carrying capacity of the panel, allowing utilization of lighter materials to achieve the same load carrying capacity as heavier materials.

25 Claims, 9 Drawing Sheets (56) References Cited

U.S. PATENT DOCUMENTS

2022/0001940 A1\* 1/2022 Chumchal ............ B62D 33/023
2022/0289306 A1\* 9/2022 Thomas ............. B62D 25/2054

\* cited by examiner

TRAILER FLOOR PANEL

BACKGROUND OF INVENTION

According to the Environmental Protection Agency (EPA) every 100 lbs. a vehicle carries can reduce the miles per gallon (MPG) by about 1% or more, depending on the vehicle (Worldwide Website: fueleconomy.gov/feg/driveHabits.jsp). Further, the use of rear-mounted cargo boxes or trays to carry weight can reduce fuel economy 1% or 2% in city driving and 1% to 5% on the highway. One would expect fuel economy to be reduced even further for a vehicle towing a trailer, where weight and wind drag have more effect. While not always possible to reduce the weight of a load, reducing the weight and bulk of the trailer can reduce vehicle fuel consumption.

Flatbed, utility, and long haul trailers usually have a flat or platform floor. The floor is typically sheet metal and/or wood secured to multiple cross-members. The heavier the item to be towed, the sturdier and heavier the floor material required to reduce flexion or bending of the panel, which can result in failure of the material. Much of the weight and bulk of a trailer can be in the floor and cross-members that support the load, which increases the height of the trailer floor resulting in more wind drag on the vehicle. While a 1% to 5% decrease in fuel economy can seem minor in a small car with a rear-mounted cargo box, trucks and larger vehicles towing items with a bulky, heavy trailer over a long distance will realize a significant increase in fuel consumption.

Practically everything at some time is towed or hauled on a trailer. Given the continued increase in the price of fuel and the demand to move more items over roads and highways, there is a need for lighter, less bulky trailers with the same towing capabilities as heavier trailers. It would be further beneficial if such lighter trailer floors could be more easily assembled without specialized tools or extensive welding.

BRIEF SUMMARY

The subject invention provides devices and methods for constructing a lightweight floor for a utility trailer that achieves the same weight bearing capacity as a conventional trailer of the same dimensions. In particular, the subject invention pertains to a trailer floor panel with structural reinforcements that can be supported on cross-members that engage with the structural reinforcements to inhibit flexion of the floor panel. Reducing flexion allows use of lighter or smaller gauge floor material, while providing the same weight bearing capacity as a trailer floor of the same dimensions utilizing conventional heavier materials with cross-members.

A floor panel of the subject invention can have an elongated platform on which a load can be placed with a lower surface that rests on one or more cross-members. Each side of the platform can have a longitudinal edge from which a plurality of sidewalls extend downward to be approximately perpendicular to the lower surface. The sidewalls can extend in parallel on each edge and in paired relation, such that a first plurality of sidewalls on the first edge is next to or aligned next to a second plurality of sidewalls on the opposite or second edge. The plurality of sidewalls can be spaced on each edge such that between each sidewall is an opening or slot in which a cross-member is placed so that it extends across the platform or traverses the platform from one edge to the opposite edge. The cross-members can abut or be at least in close proximity to the ends of the sidewalls.

Advantageously, when a load is placed on the panel, the sidewalls can be pushed against the cross-members, which inhibits the sidewalls from moving and the openings or slots from flaring or spreading. Inhibiting the movement of the sidewalls can also inhibit flexion of the platform between the sidewalls. Inhibiting flexion of the platform increases the weight bearing capacity of the panel, thus the thickness of the platform material can be reduced.

When utilized to construct a trailer floor, floor panels of the subject invention can be placed side-by-side or edge-to-edge and transverse one or more cross-members. With this configuration, the sidewalls and cross-members can form a grid over the lower surface, so that each section of a platform is supported by the sidewalls abutting and engaging with the cross-members. This increased support allows the use of a thinner material (e.g., smaller gauge steel sheet) for a panel, which can reduce the floor weight and height.

The sidewalls on one edge of the platform can also have brackets that extend perpendicular from a bottom edge of the sidewalls. When panels are placed edge-to-edge, the sidewalls of one floor panel can be supported on the brackets extending from the sidewalls of the neighboring panel. The brackets can provide additional inhibition of platform flexion in addition to supporting the longitudinal length of the neighboring panel. The brackets can also interconnect the panels so a trailer floor can be a fully supported, solid structure that does not require the side edges to be attached to each other, as with conventional trailers with flat sheet metal floors.

A trailer floor constructed with panels of the subject invention can be lighter weight and have a smaller profile than conventional trailers that utilize flat sheet metal secured to each other across the top of multiple cross-members. By utilizing sidewalls between the cross-members, the upper platform of the subject invention can have increased support, resulting in less flexion and greater weight bearing capacity utilizing thinner materials and a smaller profile.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description are specific to the embodiments disclosed. Any variations of these dimensions that will allow the subject invention to function for its intended purpose are considered within the scope of the subject invention. Thus, understanding that these drawings depict only typical embodiments of the invention and are not therefore to be considered as limiting in scope, the invention will be described and explained with additional specificity and detail through use of the accompanying drawings in which.

DETAILED DISCLOSURE

The subject invention pertains to devices and methods for constructing a lightweight floor for a utility trailer (hereinafter referred to as a "trailer") that has comparatively the same load bearing capacity as heavier trailers of the same size. More specifically, the subject invention provides one or more embodiments of a floor panel for use in constructing a trailer floor.

The subject invention is particularly useful with trailers that are towed behind a vehicle, but can also be applicable to vehicles that have floors, such as pick-up trucks, panel trucks, and the like. As the ordinary artisan can readily envision, embodiments of the subject invention could have other applications that are not related to trailers or vehicles, such as floors or even walls for buildings and other structures.

In order to provide a clear and consistent understanding of the specification and claims, the following definitions are provided.

As used herein, terms indicating relative direction or orientation, including but not limited to "upper", "lower", "top", "bottom", "vertical", "horizontal", "outer", "inner", "front", "back", "side" and the like, are intended to facilitate description of the present invention by indicating relative orientation or direction in usual use, and are not intended to limit the scope of the present invention in any way to such orientations or directions.

As used herein, the term or "longitudinal length" refers to the longitudinal measurement or the distance extending along the long axis of the object. For example, the longitudinal length of panel is the distance or direction between the front end to the back end.

Further, as used herein, the terms "about" or "approximately" as applied to a numerical value or range of values are intended to mean that the recited values can vary within an acceptable degree of error for the quantity measured given the nature or precision of the measurements, such that the variation is considered in the art as equivalent to the recited values and provides the same function or result. For example, the degree of error can be indicated by the number of significant figures provided for the measurement, as is understood in the art, and includes but is not limited to a variation of ±1 in the most precise significant figure reported for the measurement. Typical exemplary degrees of error are within 20 percent (%), preferably within 10%, and more preferably within 5% of a given value or range of values. Numerical quantities given herein are approximate unless stated otherwise, meaning that the term "about" or "approximately" can be inferred when not expressly stated.

It is to be understood that the figures and descriptions of embodiments of the present invention have been simplified to illustrate elements that are relevant for a clear understanding of the invention, while eliminating, for purposes of clarity, other elements that may be well known. Those of ordinary skill in the art will recognize that other elements may be desirable and/or required in order to implement the present invention.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. Use of the term "comprising" contemplates other embodiments that "consist" or "consist essentially of" the recited component(s).

Any reference in this specification to "one embodiment," "an embodiment," "example embodiment," "further embodiment," "alternative embodiment," "select embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the use of "and/or" is defined inclusively such that the term "a and/or b" should be read to include the sets: "a and b," "a or b," "a," "b." Finally, as used in the specification and in the claims, the singular for "a," "an" and "the" include plural referents unless the context clearly dictates otherwise.

The present invention is more particularly described in the following examples that are intended to be illustrative only because numerous modifications and variations therein will be apparent to those skilled in the art.

With reference to the attached figures, on which the same reference numerals are used throughout to indicate the same or similar components for the embodiments shown, it can be seen that the subject invention comprises a floor panel 100 with a platform 110 that has an upper surface 112 and a lower surface 116 with a first side edge 118 and an opposite second side edge 120 that define a longitudinal length 125 between a front end 10 and a back end 20. A first plurality 148 of sidewalls 140 extend from the first side edge and a second plurality 149 of sidewalls extends from the second side edge towards the lower surface and are approximately perpendicular to the platform. The plurality of sidewalls on each edge are distanced from each other to provide an opening or slot 150 therebetween for a cross-member 50 placed transverse to the panel. Particular embodiments include a bracket 160 that extends perpendicularly from a terminal end 144 of a sidewall and away from the lower surface. Certain embodiments can also include a duck tail 117 at the back end where a portion of the panel is angled downwards. Other embodiments can include various non-skid features on the upper surface.

The components of a floor panel 100 can be rigidly and fixedly attached to one another, such that a floor panel is a unitary structure. Regardless of the orientation of a floor panel, the components can maintain the same spatial relationship to each other. The materials utilized for the components of a floor panel can depend on a variety of factors known to those with skill in the art. For example, a floor pane can be manufactured from any of a variety of metal sheets, such as, for example, steel or aluminum sheets, or some combination thereof that is molded, welded, bent, pressed, or otherwise formed to provide a unitary structure. In one embodiment, a floor panel is made of steel sheet metal with a thickness of between about 10 gauge and about 16 gauge or a thickness of between about ⅛" and about ¼". In another embodiment, a floor panel is made of aluminum sheet metal with a thickness of between about 8 gauge and about 16 gauge or thickness of between about ¹⁄₁₆" and about ¼". These embodiments do not preclude using thicker or thinner sheet metal, but the distance between the cross-members 50 can be adjusted to facilitate different weight bearing capacities. The floor panels of the subject invention can provide the advantage of allowing greater distance between the cross-members if utilizing thicker sheet metal or placing cross members at a standard distance, but utilizing thinner sheet metal to achieve the same load bearing capacity, each option providing a lighter and less bulky trailer. The longitudinal length of a sidewall can be approximately 12 inches, 13 inches, 14 inches, 15 inches, 16 inches, 17 inches, 18 inches, 19 inches, 20 inches, 21 inches, 22 inches, 23 inches, or 24 inches or longitudinal distance between any of the listed values. It is typical in the industry, but not mandatory, for cross members to be about 16" apart on a utility trailer. A specific embodiment of the subject invention utilizes this same distance between cross members, but employs thinner sheet metal for the platform, while achieving about the same weight bearing capacity as conventional trailers.

Figures 1, 2:
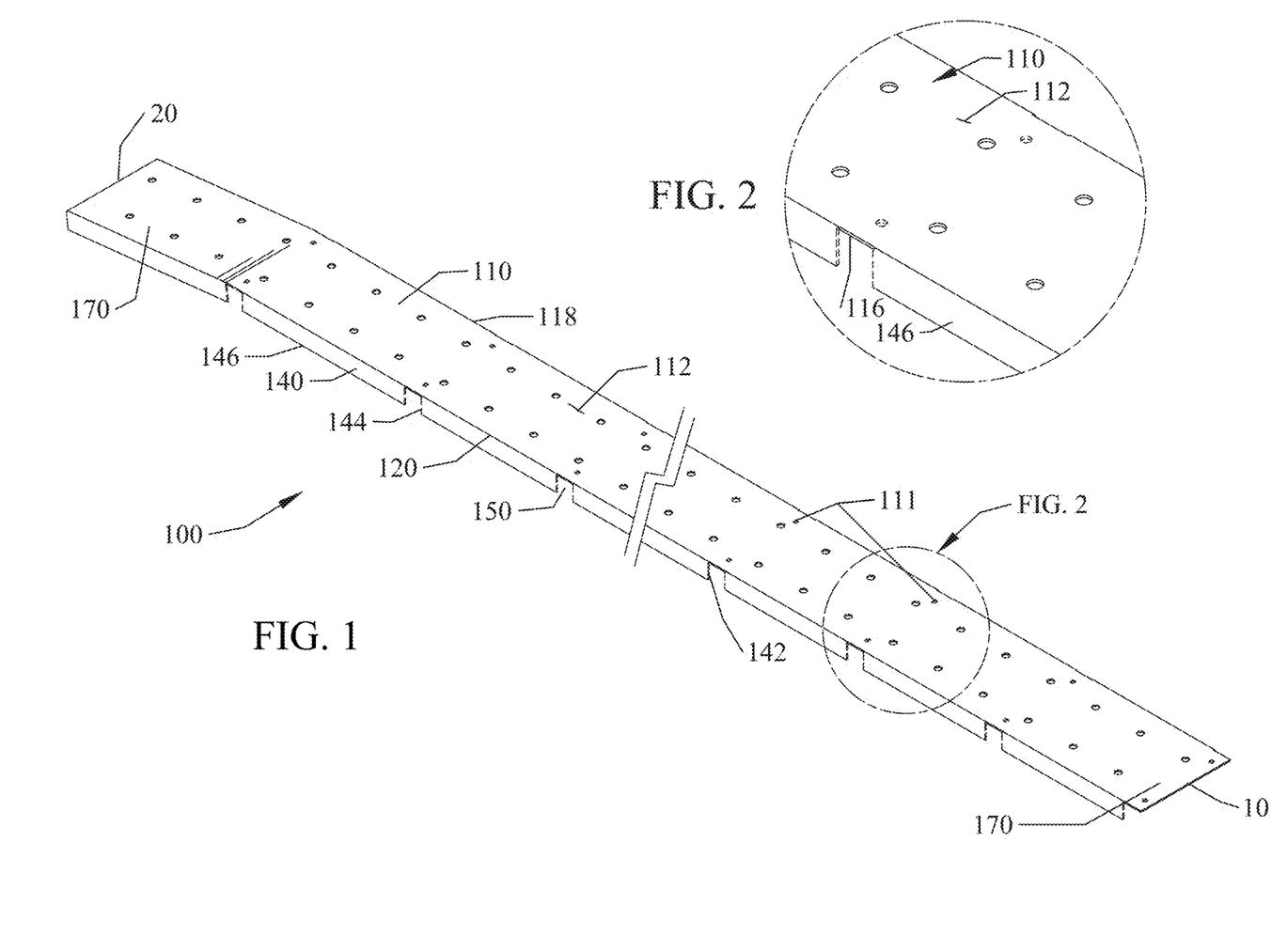
FIG. 1 is a perspective view of a floor panel, according to the subject invention.
FIG. 2 is an enlarged view of a portion of the floor panel in FIG. 1.
Figure 3:
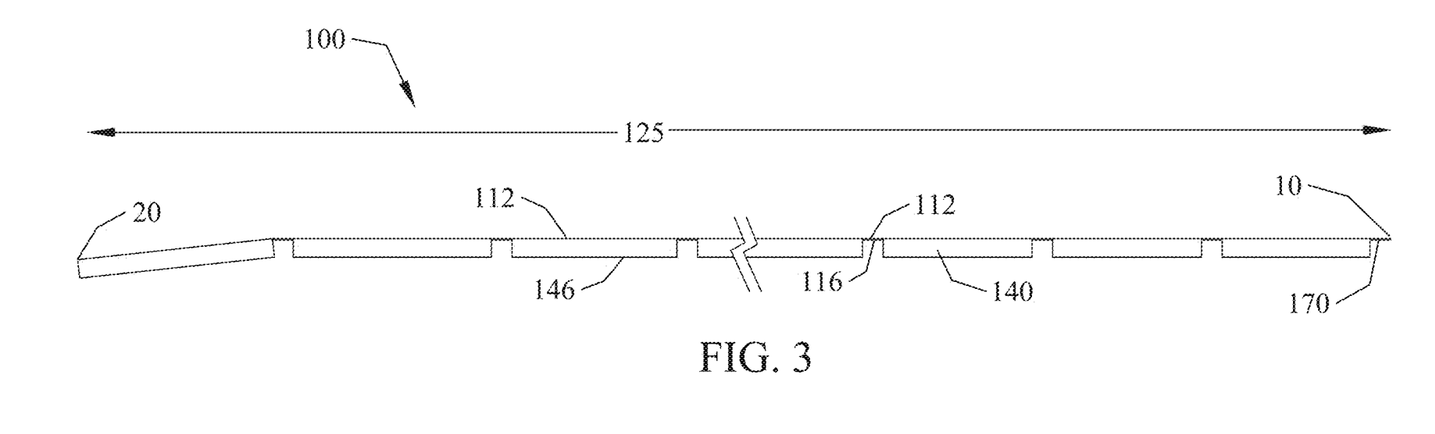
FIG. 3 is a side elevation view of the floor panel in FIG. 1.
Figure 4:
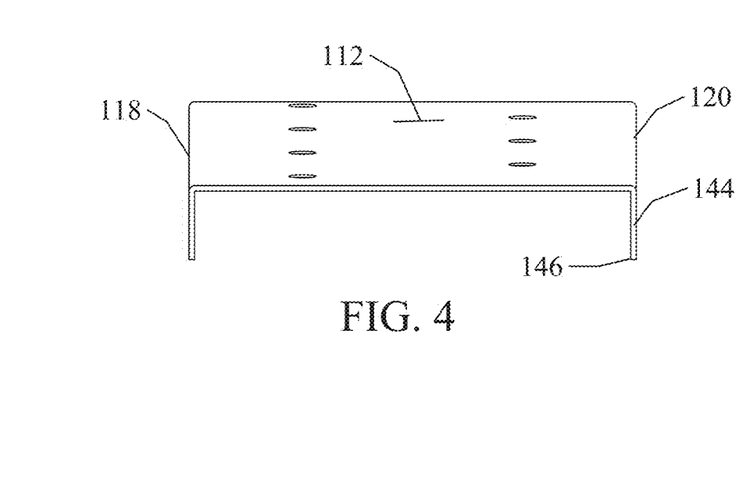
FIG. 4 is a back end elevation view of the floor panel in FIG. 1.
Figure 5:
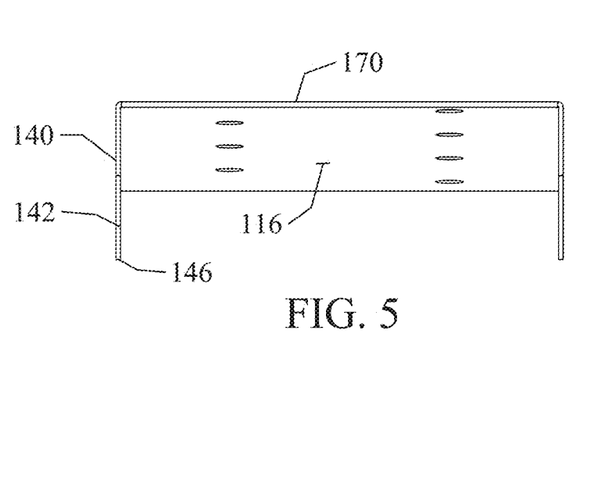
FIG. 5 is a front end elevation view of the floor panel in FIG. 1.

In one embodiment, a floor panel has a platform 110 with an upper surface 112 and an opposite lower surface 116 that define a first edge 118 and an opposite second edge 120. The longitudinal length 30 between the front end 10 and the back end 20 of the panel, as shown in FIG. 3, can be between about 5.0 ft. and 16.0 ft, preferably between about 8.0 ft and about 14.0 ft, more preferably between about 10.0 ft. and about 12.0 feet. These ranges in longitudinal length are for typical over-the-road trailers. Longer floor panels are also possible for specialized trailers, thus could have a longitudinal length greater than 16.0 ft. Floor panels can also be overlapped at an overhang 170 to provide a trailer floor 200 of practically any longitudinal length. In one embodiment, a panel has a ducktail at the back end to facilitate rolling or driving onto the panel or a trailer constructed of multiple panels. The longitudinal length of the ducktail 117 can be approximately 1.0 ft., 1.25 ft., 1.5 ft., 1.75 ft., 2 ft., 2.25 ft., 2.5 ft., 2.75 ft., 3 ft., 3.25 ft., 3.5 ft., 3.75 ft., or 4 ft., or a longitudinal length between any two of the listed values.

Figure 6:
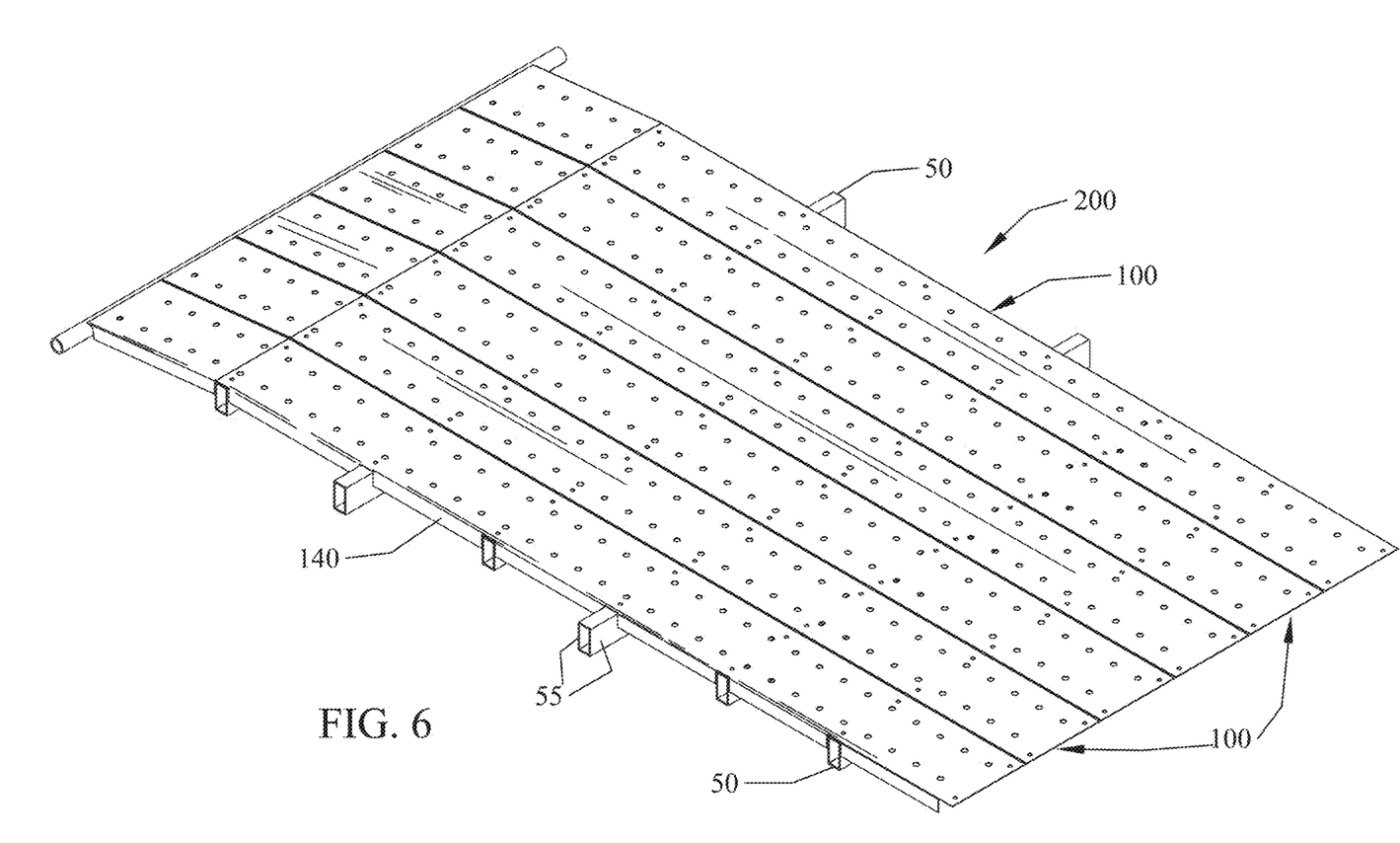
FIG. 6 is a perspective view of an embodiment of a trailer floor constructed of floor panels shown in FIG. 1.
Figures 7, 8:
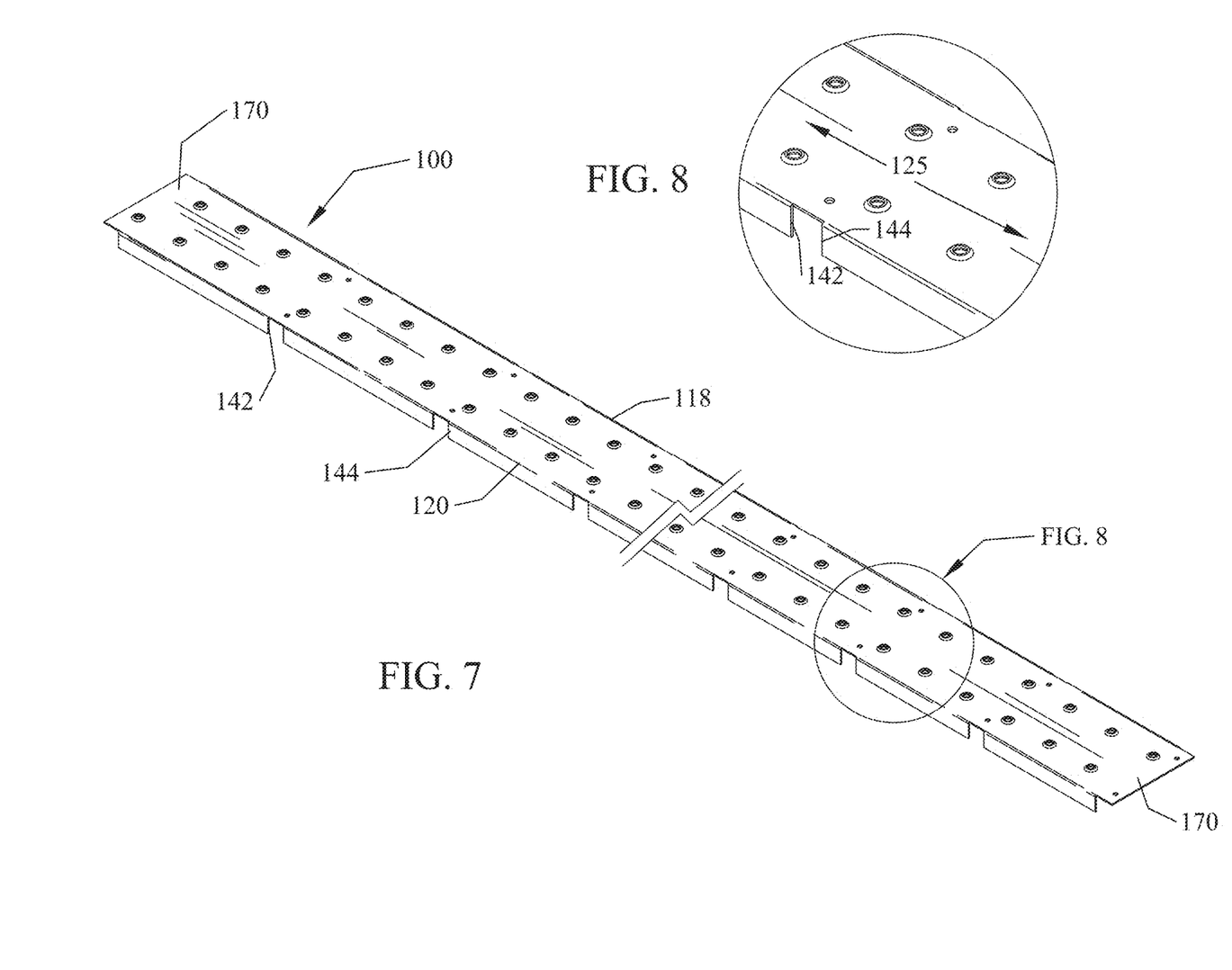
FIG. 7 is a perspective view of another embodiment of a floor panel, according to the subject invention.
FIG. 8 is an enlarged view of a portion of the floor panel in FIG. 7.
Figure 13:
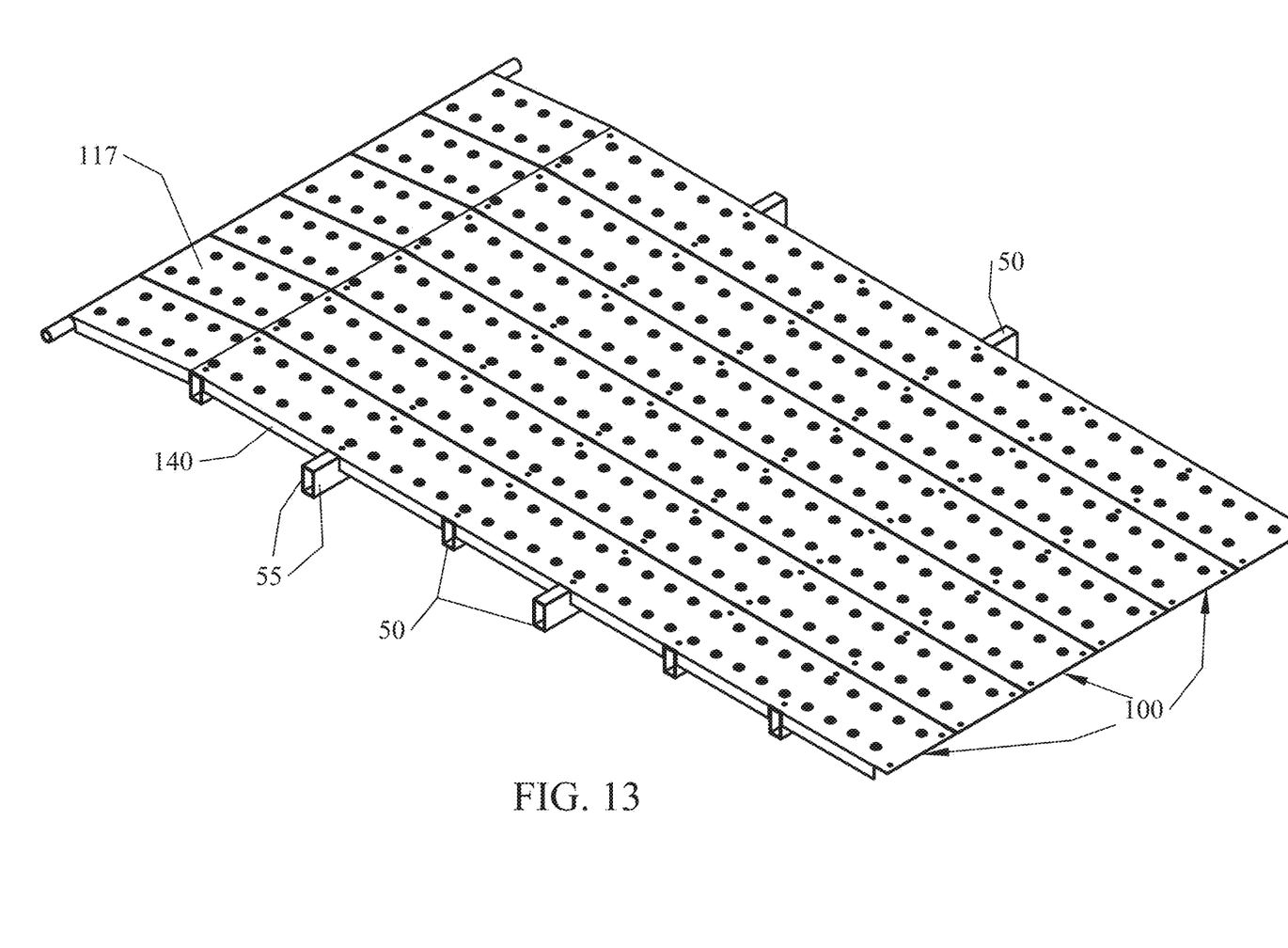
FIG. 13 is a perspective view of an embodiment of a trailer floor constructed of the floor panels shown in FIG. 7.
Figure 14:
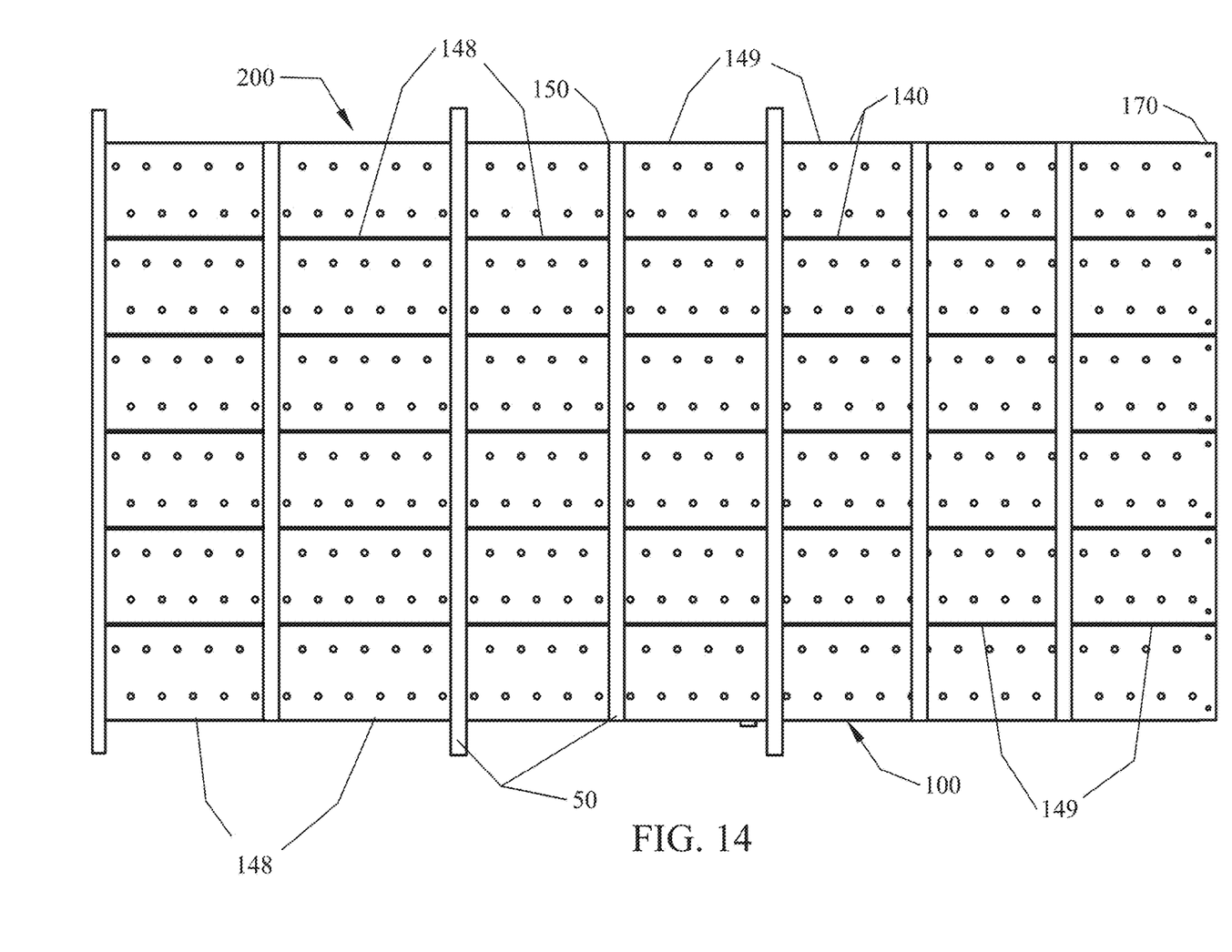
FIG. 14 is a bottom plan view of a trailer floor constructed with the panels shown in FIG. 1 or 7. The grid formed by the first plurality of sidewalls, the second plurality of sidewalls, and the transverse cross-members can be seen in this figure.

The lower surface 116 of a platform 110 of a floor panel 100 can be positioned against a cross-member 50, such as shown, for example, in FIGS. 6, 13, and 14. In one embodiment, the platform has bore holes 111 that can be used to secure the platform to a cross-member. For example, the panel can be secured with coupling devices, which can include, but are not limited to, bolts, pins, and rivets, other materials can also be utilized, such as, for example, industrial adhesives. In a specific embodiment, the bore holes are utilized to plug weld the platform to a cross member. As discussed further below, the advantageous sidewalls assist in maintaining the panels on the cross-members. Thus, securing the platform to the cross-members through the bore holes can provide sufficient stability to a trailer floor 200, making additional attachment to the cross-members to other panels unnecessary or optional.

Extending in the direction of the lower surface and along the first side edge 118 and the opposite second side edge 120 are sidewalls 140. A first plurality of sidewalls 148 can extend from the first edge 118 and a second plurality of sidewalls can extend from the second edge 120, such as shown, for example, in FIGS. 4, 5, 9A, and 14. In one embodiment, the sidewalls are in line or parallel along the side edges 118 and 120. In a further embodiment, the sidewalls are in paired relation on each side edge, such that a sidewall on the first side edge has a matching or paired sidewall on the second side edge, which can be seen, for example, in FIGS. 4, 5, 14, and 16. A sidewall can have a front edge 142 directed towards the front end, a back edge 144 directed towards the back end, and a bottom edge 146 opposite to the respective side edge, which are shown, for example, in FIGS. 4, 5, 7, and 8.

Figure 9A:
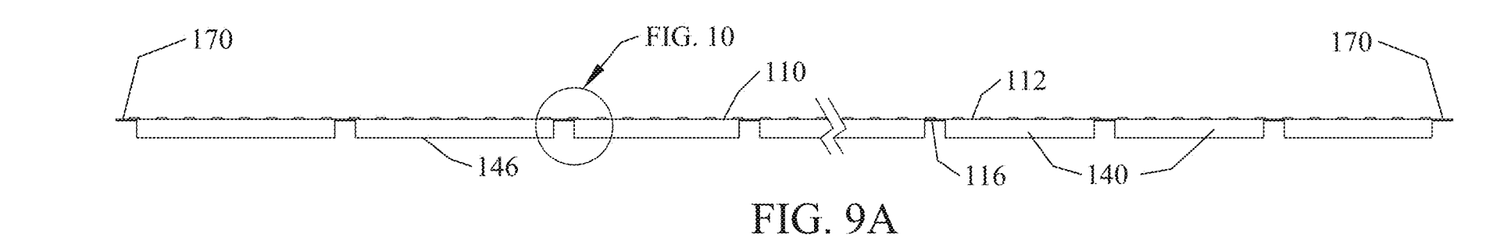
FIG. 9A is a side elevation view of the floor panel in FIG. 7.
Figures 9B, 10:
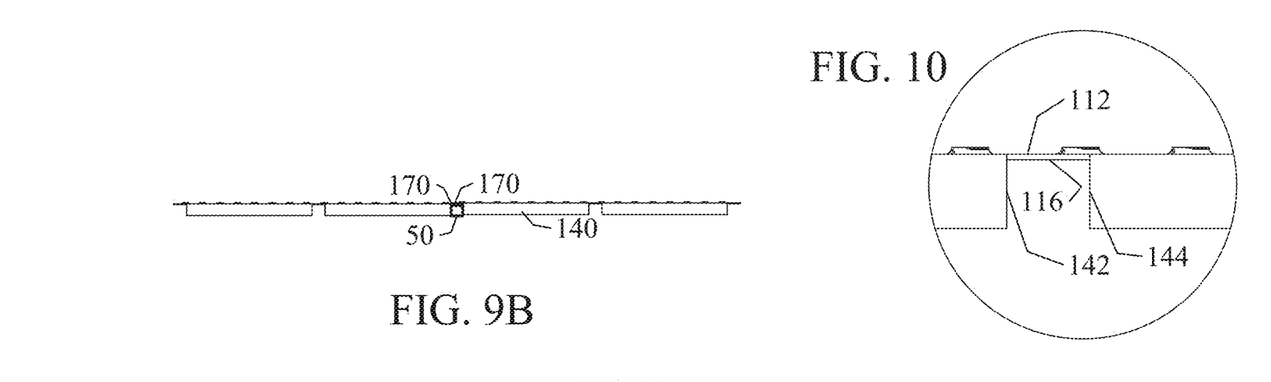
FIG. 9B is a side elevation view of two overlapping panels supported on a cross member therebetween.
FIG. 10 is an enlarged portion of the floor panel shown in FIG. 7.
Figure 11:
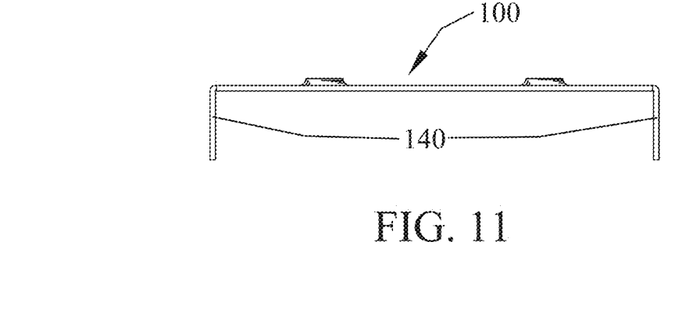
FIG. 11 is a front end elevation view of the floor panel shown in FIG. 7.
Figure 12:
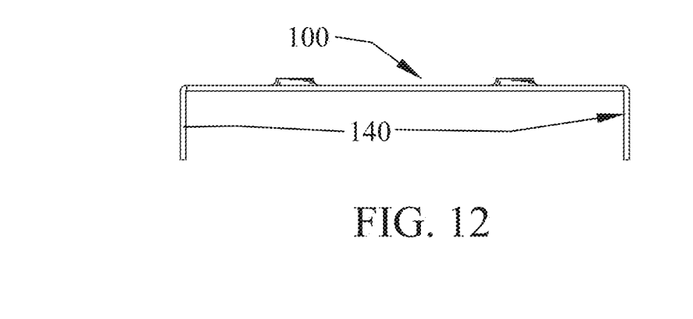
FIG. 12 is a back end elevation view of the floor panel shown in FIG. 7.

In one embodiment, the plurality of sidewalls are spaced on each of the first and second side edges 118 and 120, such that there is an opening or slot 150 between the front edges 142 and the back edges 144 of the sidewalls on each side edge. Thus, a floor panel of the subject invention can have a plurality of sidewalls on each side edge of the platform and can have a slot between each pair of sidewalls. FIGS. 9A and 10 show a non-limiting example of sidewalls extending downward on a side edge of a platform. In one particular embodiment, there is a slot before the first sidewall 140 at the front end of the panel to provide an overhang 170 on the front end and/or a slot after the last sidewall at the back end of the panel to provide an overhang on at least one of the front end 10 and the back end 20. Panels can be overlapped at one or both of the overhangs to provide a longer trailer floor. FIG. 9B shows a non-limiting example of overlapped panels 100 with a cross member arranged in the slot 150 between the overlapping panels.

Floor panels can be arranged with platforms in parallel. Floor panels can be arranged adjacent to each other, such that the sidewalls are in contact or at least in as proximity as possible. Alternatively, floor panels can be spaced apart in any of a variety of configurations. For example, two panels could be adjacent and spaced apart from two other panels that are adjacent. FIG. 14 illustrates a bottom view of a specific embodiment of a trailer floor 200 constructed of multiple floor panels 100 and cross members 50 placed with the front edges and back edges of the sidewalls buttressed against either side of the cross members in the slots 150. It can be seen in this example, that the front edges and back edges are arranged close to or abutting the cross members, which can strengthen the platform by inhibiting opening or spreading of the slots. In one embodiment, a slot has a width between the front edge 142 of one sidewall and the back edge 142 of an adjacent sidewall, on the same side edge, of approximately 2 inches, 2.25 inches, 2.5 inches, 2.75 inches, 3 inches, 3.25 inches, 3.5 inches, 3.75 inches, 4 inches, 4.25 inches, 4.5 inches, 4.75 inches, or 5 inches, or width between any two of the listed values.

A sidewall can have a height between the side edge and the bottom edge 146 between about ¼ to about ¾ of the height of the cross-member 50 placed within the slot 150. Ideally, a sidewall has a height that is about ½ of the height of the cross-member. This can allow the entire front edge 142 and the entire back edge 144 of the sidewalls to make contact with the cross-member and reduces unnecessary weight of the panel and a trailer floor 200 made therefrom. This is not to imply the sidewalls cannot be of greater height, but the advantageous design of the floor panels does not require that the sidewalls extend to or beyond the height of the cross-members, and they can be effective even if shorter than the cross-members, as shown by way of example, in FIGS. 6 and 13, to reduce weight. In one embodiment, the sidewalls have a height of approximately 1 inch, 1.5 inch, 2 inches, 2.5 inches, 3 inches, 3.5 inches, or 4 inches, or a height between any two of the listed values. In a further embodiment, a slot between sidewalls a slot has a width between the between a front edge 142 of one sidewall and a back edge 114 of an adjacent sidewall of approximately 2 inches, 2.25 inches, 2.5 inches, 2.75 inches, 3 inches, 3.25 inches, 3.5 inches, 3.75 inches, 4 inches, 4.25 inches, 4.5 inches, 4.75 inches, or 5 inches.

Figure 17:
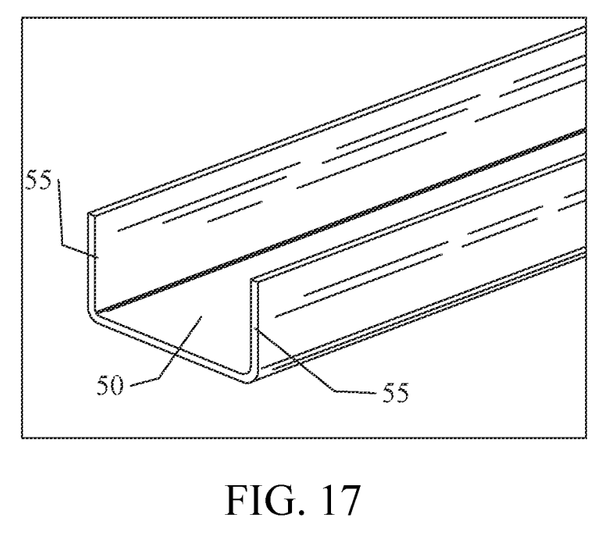
FIG. 17 is a view of one end of a U-shaped cross-member that can be utilized with embodiments of the subject invention.
Figure 18:
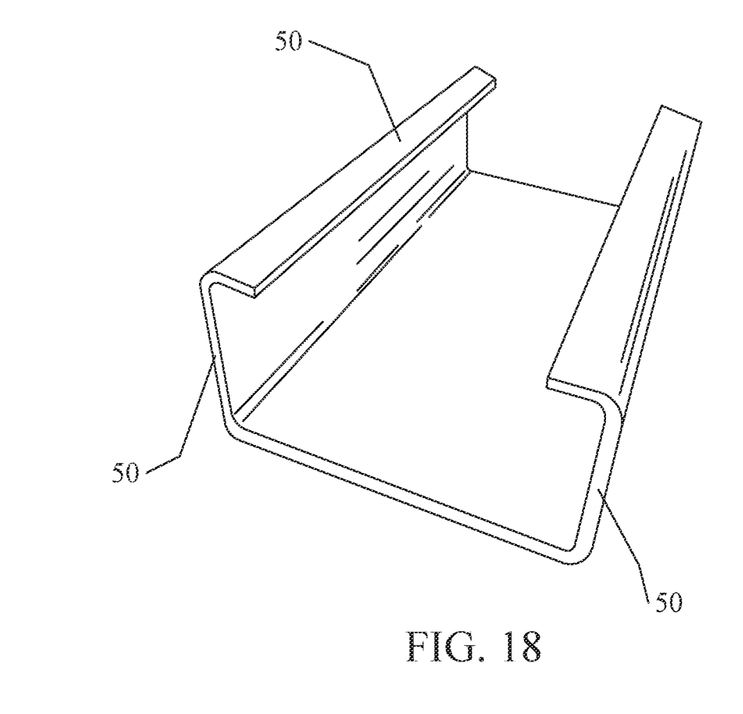
FIG. 18 is a view of a portion of a C-shaped cross-member that can be utilized with embodiments of the subject invention.

In constructing a trailer floor 200, multiple floor panels can be placed side-by-side with parallel longitudinal lengths, as shown, for example in FIGS. 6 and 13. The floor panels can be supported on multiple cross-members, as shown, arranged in the slots and transverse to the side-by-side floor panels 100. Cross-members can have any of a variety of circumferential shapes, from round to square or rectangular and any polygonal shape therebetween. Typical cross members utilized with trailers, such as utility trailers, are elongated square or rectangular tubes. FIGS. 6 and 13 show non-limiting examples of rectangular cross-members. FIGS. 17 and 18 show embodiments of cross-members having a U-shape and a C-shape, respectively, which can be beneficial in constructing trailer floors with panels of the subject invention and can also reduce the overall weight of a trailer. The U-shape and C-shape configurations facilitate installation of various components required or utilized with trailer, such as, for example, a wiring harness, wheel axles, brake components, or other accessories.

On advantage of the sidewalls 140 is the abutment of the front edges 142 and the back edges 144 against the cross-members, which can inhibit a platform from flexing. The ability to inhibit vertical flexing of the platform between any two cross members can increase the strength of the platform and allow the use of thinner materials to achieve the same or similar weight bearing capabilities as a thicker panel without sidewalls. Thus, the amount of contact and location of the sidewalls with the cross members can affect the strength of the panel. In one embodiment, a cross member has at least two walls 55 against which the sidewalls can make contact. In a further embodiment, the at least two walls of the cross member have a height that is at least the height of the sidewalls. In a specific embodiment, the height of a sidewall of a floor panel is less than or about equal to the one-half the height of the at least two walls of a cross-member. In a further specific embodiment, the at least two walls 55 of a cross member are vertical and the sidewalls have corresponding vertical front edges 142 and vertical back edges 144 for contacting the vertical walls of the cross member.

Extending from at or near the bottom edge 146 of a sidewall 140 can be a bracket 160. A bracket can extend away from the floor panel 100 and approximately perpendicular to the sidewall, which is shown, for example, in FIGS. 15A and 16. Thus, a bracket can be approximately parallel to the platform 110 and approximately perpendicular to the sidewall, so that it forms a shelf on the sidewall. In one embodiment, a bracket is fixedly attached to the one or more or the plurality of sidewalls on one of either the first side edge 118 or on the opposite second side edge 120. Further, a bracket can extend from anywhere between the front edge 142 and the back edge 144 of a sidewall. In a specific embodiment, a bracket has the same longitudinal length as the sidewall, so can extend from the front edge to the back edge of a sidewall.

Figures 15A, 15B:
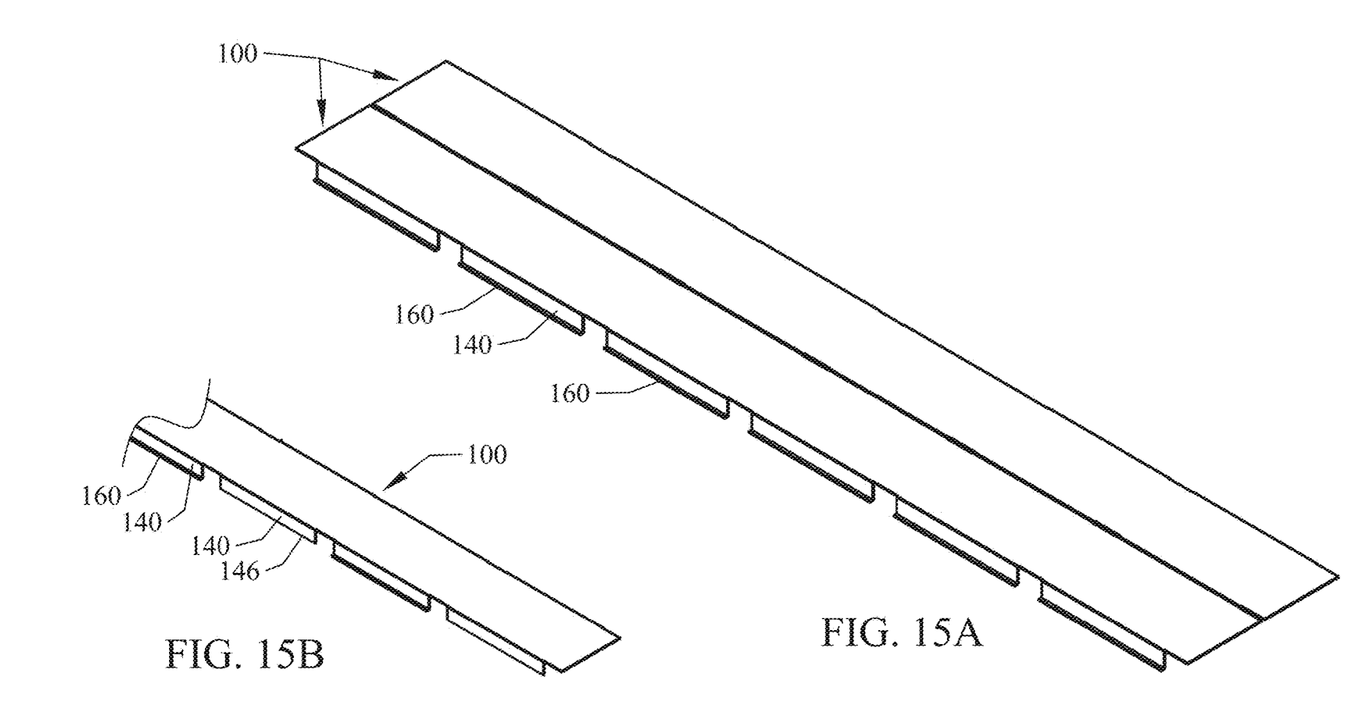
FIG. 15A is a perspective view of a further embodiment of two floor panels with brackets that are placed side-by-side with the plurality of sidewalls on one edge of one panel supported on the brackets of the panel there beside.
FIG. 15B is a perspective view of an embodiment of a floor panel with brackets on certain sidewalls on an edge of the panel.

A bracket can extend out or away from a sidewall to form a shelf on which a sidewall of an adjacent panel can be supported. In one embodiment, a backet is approximately 5% to approximately 50% longer than the thickness of a sidewall on the opposite edge of the panel. In an alternative embodiment, the bracket extends from a sidewall to a distance that is approximately equivalent to the thickness of the sidewall on the opposite edge of the panel. In one embodiment, the sidewalls on one of the first edge or the second edge are thinner or have a smaller depth across the front edge 142 and the back edge 144 than the sidewalls on the opposite edge. In a further embodiment, a bracket can be wide enough to support the smaller width sidewalls. As the ordinary artisan can readily envision, one or more brackets can be on the sidewalls on either edge of the panel. In another embodiment, brackets can be arranged on certain sidewalls on one edge and/or on certain sidewalls on the opposite edge, an example of which is shown in FIG. 15B.

Figure 16:
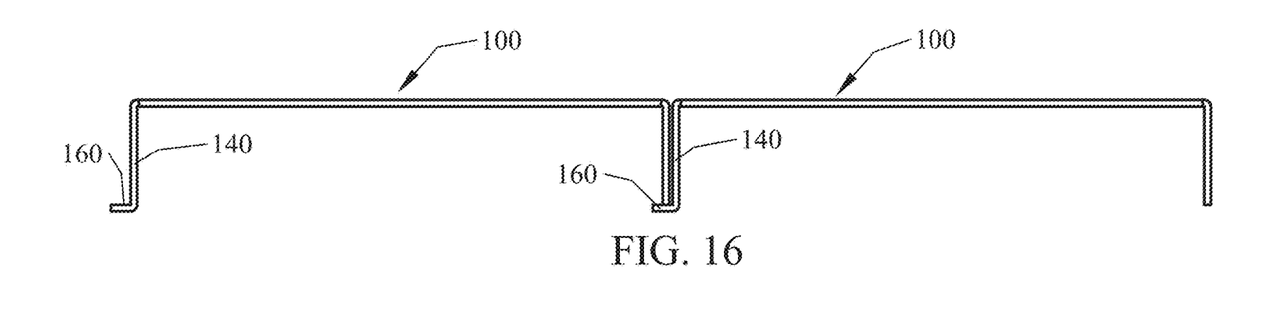
FIG. 16 is an enlarged, front end elevation view of the two floor panels in FIG. 15 showing the side walls of one panel supported on the brackets on the sidewalls of the panel there beside.

A bracket 160 can strengthen a sidewall and simultaneously support one or more sidewalls on an adjacent floor panel, as shown in the example in FIG. 16. A trailer floor 200 can have multiple adjacent floor panels arranged in parallel with their sidewalls next to each other and in sufficient proximity that the non-bracketed sidewalls on one edge of a floor panel sit on or are supported on the one or more brackets on the sidewalls of an adjacent floor panel. This can provide a trailer floor 200 of linked or integrated floor panels, each supporting and supported on an adjacent floor panel. The support provided to the sidewalls by the brackets can increase the load carrying capacity of the platform by further inhibiting flexion of the platform. As discussed above, cross-members 50 arranged transverse to the longitudinal length of the platform and within the slots 150 can support or provide resistance against the front edges 142 and back edges 144 of the sidewalls. Advantageously, when a load is placed on a floor panel, the support that a cross-member provides to a sidewall can inhibit expansion or flaring of the slots by resisting the movement of the sidewalls, which simultaneously inhibits flexion of the platform. Inhibition of flexion can increase the load bearing capacity of the platform.

The brackets 160 can also inhibit flexion by supporting the sidewalls along the bottom edge and can increase the interconnectivity of the floor panels. The interconnectivity of the floor panels 110 can provide support across the trailer floor 200. Typically, when trailer floors are constructed of metal sheets, the sheets are welded along each side to form a solid trailer floor. The solid trailer floor is then welded or otherwise attached to an undercarriage and/or cross-members arranged beneath the solid trailer floor. Embodiments of a floor panel that include brackets on the sidewalls eliminate the necessity of welding the floor panels 100 to each other. As discussed above, the floor panels can have bore holes 111 that can be utilized to attach the floor panels to the cross-members. For example, the floor panels can be plug welded through the bore holes to the cross-members. This can make assembly of a trailer floor quicker and easier. By increasing the load bearing capacity of thinner materials, the weight of a trailer can be reduced and the thickness of the trailer floor can be reduced as well.

Trailers for towing and other vehicles can benefit from lighter weight materials. Embodiments of the subject invention are particularly beneficial for towable trailers and vehicles that have heavy duty floors. Embodiments of the subject invention allow lighter weight materials to be utilized for those floors, while providing the same or similar weight carrying capacity. The modularity of the floor also allows for easier construction and floors of variable sizes.

The examples and embodiments described herein are for illustrative purposes only and that various modifications or changes in light thereof will be suggested to persons skilled in the art and are to be included within the spirit and purview of this application.

I claim:

1. A panel comprising:
   a platform having a front end, a back end, a first edge, and a second edge, with an upper surface and a lower surface therebetween;
   a first plurality of sidewalls that extend in parallel from the first edge, each sidewall comprising a front edge and a back edge;
   a second plurality of sidewalls that extend from the second edge that are parallel to and in paired relation with the first plurality of sidewalls that extend from the first edge, each sidewall comprising a front edge and a back edge;
   a plurality of slots having a width between the front edges and back edges of adjacent sidewalls on the first edge and the second edge, configured to receive cross-members having a top and at least two vertical walls, such that the width of a slot allows at least one of the front edge of one sidewall and the back edge of an adjacent sidewall to abut the vertical walls of the cross-member, and the lower surface between the first edge and the second edge of the platform between slots contacts the top of the cross-member, thereby inhibiting flexion of the platform.

2. The panel according to claim 1, further comprising a bracket that extends from a bottom edge of one or more of the sidewalls of at least one of the first and second plurality of sidewalls.

3. The panel according to claim 1, wherein the sidewalls have a longitudinal length of approximately 12 inches, 13 inches, 14 inches, 15 inches, 16 inches, 17 inches, 18 inches, 19 inches, 20 inches, 21 inches, 22 inches, 23 inches, or 24 inches.

4. The panel according to claim 1, wherein the sidewalls have a height of approximately 1 inch, 1.5 inch, 2 inches, 2.5 inches, 3 inches, 3.5 inches, or 4 inches.

5. The panel according to claim 1, wherein a slot between a front edge of one sidewall and a back edge of an adjacent sidewall has a width that is approximately 2 inches, 2.25 inches, 2.5 inches, 2.75 inches, 3 inches, 3.25 inches, 3.5 inches, 3.75 inches, 4 inches, 4.25 inches, 4.5 inches, 4.75 inches, or 5 inches.

6. The panel according to claim 1, wherein the platform comprises metallic plate with a thickness of approximately 10 gauge, 11 gauge, 12 gauge, 13 gauge, 14 gauge, 15 gauge, or 16 gauge.

7. The panel according to claim 1, wherein the length of the platform is between approximately 5 feet and approximately 16 feet.

8. The panel according to claim 7, wherein the length of the platform is between approximately 8 feet and approximately 12 feet.

9. The panel according to claim 8, wherein the length of the platform is approximately 10 feet.

10. The panel according to claim 9, wherein the width of the platform, between the first edge and the second edge is between approximately 4 inches and approximately 12 inches.

11. The panel according to claim 10, wherein the width of the platform, between the first edge and the second edge is between approximately 6 inches and approximately 10 inches.

12. The panel according to claim 11, wherein the width of the platform, between the first edge and the second edge, is between approximately 7 inches and approximately 9 inches.

13. The panel according to claim 1, further comprising a ducktail at the back end.

14. The panel according to claim 13, wherein the ducktail has a longitudinal length of approximately 1 ft., 1.25 ft., 1.5 ft., 1.75 ft., 2 ft., 2.25 ft., 2.5 ft., 2.75 ft., 3 ft., 3.25 ft., 3.5 ft., 3.75 ft., and 4 ft.

15. The panel according to claim 1, further comprising a plurality of bore holes through the platform that open onto the lower surface, such that when the cross-member is received in a slot, the bore holes are between the at least two vertical walls of the cross-member.

16. The panel according to claim 1, further comprising an overhang on at least one of the front end and the back end, wherein the upper surface and lower surface of the platform and an upper surface and a lower surface of the overhang are coplanar.

17. A method for constructing a trailer floor, the method comprising:
   obtaining two or more panels according to claim 1; and
   arranging at least one slot on the sidewalls on the first edges and on the second edges of the two or more panels on at least one cross-member, so that at least one of the front edge and the back edge of the sidewalls abuts the vertical walls of the at least one cross-member and the top of the at least one cross-member is in contact with and transverse to the lower side, between the first edge and the second edge, of each platform, such that the sidewalls and the at least one cross-member form a grid across the bottom surface of the trailer floor that inhibits flexion of the two or more panels.

18. The method according to claim 17, wherein the panel further comprises a plurality of bore holes through the platform that open onto the lower surface between the slots on the first edge and the slots on the second edge, and between the at least two vertical walls of the cross-member and the method further comprises securing the at least one panel to the at least one cross-member utilizing the plurality of bore holes.

19. The method according to claim 17, wherein the two or more panels are adjacent on the cross-member.

20. The method according to claim 19, wherein one or more of the sidewalls on at least one of the first edge and the second edge of the two or more panels comprise a bracket, and the method further comprises arranging the two or more panels with the sidewalls of one panel supported on the bracket of the one or more sidewalls of the adjacent panel.

21. The method according to claim 17, wherein the two or more panels comprise an overhang on at least one of the front end and the back end, and the method further comprises overlapping the overhang of the two or more panels.

22. A trailer floor comprising:
a plurality of panels, each panel comprising:
a platform having a front end, a back end, a first edge and a second edge, with an upper surface and a lower surface therebetween;
a first plurality of sidewalls that extend approximately perpendicular from the first edge and in paired relation with a second plurality of sidewalls that extend approximately perpendicular from the second edge, each sidewall comprising a front edge and a back edge, with slots therebetween, configured to receive cross-members having at least two longitudinal vertical walls; and
a plurality of bore holes through the platform that open onto the lower surface above the top and between the vertical walls of the cross-members received in the slots;
such that, when the cross-members are arranged in the slots transverse to the plurality of panels, the front edges and back edges of the sidewalls abut the vertical walls of the cross-members and the cross-members and sidewalls form a grid across the bottom side of the trailer floor that inhibits flexion of the panels.

23. The trailer floor according to claim 22, wherein one or more of the sidewalls on at least one of the first edge and the second edge further comprise a bracket.

24. A method for constructing a trailer floor according to claim 22, the method comprising:
obtaining a plurality of panels, each comprising:
a platform having a front end, a back end, a first edge, and a second edge, with an upper surface and a lower surface therebetween;
a first plurality of sidewalls that extend approximately perpendicular from the first edge and in paired relation with a second plurality of sidewalls that extend approximately perpendicular from the second edge, each sidewall comprising a front edge and a back edge, with slots therebetween, configured to receive cross-members having at least two longitudinal vertical walls; and
a plurality of bore holes through the platform that open onto the lower surface above the top and between the vertical walls of the cross-members received in the slots;
arranging the panels with the cross-members within the slots and transverse to the panels, and
connecting the panels to a top of the cross-members through the bore holes;
such that one or more of the sidewalls of the plurality of panels and the vertical walls of the cross-members within the slots abut to form a grid across a bottom side of the trailer floor that inhibits flexion of the panels.

25. The method according to claim 24, wherein there is a bracket on at least one sidewall of at least one of the first and the second plurality of sidewalls and the method further comprises arranging the plurality of panels with at least one sidewall supported on the bracket of a sidewall of an adjacent panel.

* * * * *